(12) United States Patent
Sun (10) Patent No.: US 10,291,744 B2
(45) Date of Patent: May 14, 2019

(54) METHOD AND APPARATUS FOR DETERMINING THE RADIATION STRENGTH OF A WI-FI SIGNAL

(71) Applicant: Hisense Mobile Communications Technology Co., Ltd., Qingdao (CN)

(72) Inventor: Zizhi Sun, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 73 days.

(21) Appl. No.: 15/277,042

(22) Filed: Sep. 27, 2016

(65) Prior Publication Data

US 2017/0163516 A1 Jun. 8, 2017

(30) Foreign Application Priority Data

Dec. 3, 2015 (CN) .......................... 2015 1 0882188

(51) Int. Cl.
| | | |
|---|---|---|
| *H04L 29/08* | (2006.01) | |
| *H04W 24/08* | (2009.01) | |
| *H04W 24/10* | (2009.01) | |
| *H04W 84/12* | (2009.01) | |

(52) U.S. Cl.
CPC ............. *H04L 67/36* (2013.01); *H04W 24/08* (2013.01); *H04W 24/10* (2013.01); *H04W 84/12* (2013.01)

(58) Field of Classification Search
CPC ..................................................... H04L 67/36

USPC ......................................................... 370/252
See application file for complete search history.

(56) References Cited

U.S. PATENT DOCUMENTS

| | | | | |
|---|---|---|---|---|
| 2007/0076640 | A1* | 4/2007 | Bonta .................... | H04W 84/18 370/310 |
| 2010/0097228 | A1 | 4/2010 | Schultz et al. | |
| 2014/0304770 | A1* | 10/2014 | Jung ...................... | H04W 12/12 726/2 |
| 2015/0038084 | A1* | 2/2015 | Dahan .................... | H04W 84/18 455/41.2 |
| 2015/0098353 | A1* | 4/2015 | Kang ................... | H04W 52/245 370/252 |

(Continued)

FOREIGN PATENT DOCUMENTS

| | | |
|---|---|---|
| CN | 101656969 A | 2/2010 |
| CN | 101776715 A | 7/2010 |

(Continued)

OTHER PUBLICATIONS

IW package information webpage, retrieved Feb. 3, 2018.*

(Continued)

*Primary Examiner* — Peter G Solinsky (74) *Attorney, Agent, or Firm* — Harness, Dickey & Pierce, P.L.C.

(57) ABSTRACT

Embodiments of the disclosure disclose a method and apparatus for determining the radiation strength of a Wi-Fi signal, and the method includes: obtaining Wi-Fi signal sources, and signal strength values of the signal sources when a Wi-Fi function is enabled; and determining the radiation strengths of corresponding Wi-Fi signals according to the number of Wi-Fi signal sources, and the signal strength values of the respective signal sources.

20 Claims, 4 Drawing Sheets

(56) References Cited

U.S. PATENT DOCUMENTS

| | | | | |
|---|---|---|---|---|
| 2016/0164564 A1* | 6/2016 | Xiao | .................... | H04B 1/3838 |
| | | | | 455/425 |
| 2017/0264330 A1* | 9/2017 | Huang | ................. | H04B 1/3838 |
| 2017/0293035 A1* | 10/2017 | Badyal | ...................... | G01T 7/00 |
| 2018/0078579 A1* | 3/2018 | Haase | .................... | A61K 45/06 |

FOREIGN PATENT DOCUMENTS

| | | | |
|---|---|---|---|
| CN | 202143129 U | 2/2012 | |
| CN | 103516879 A | 1/2014 | |
| CN | 104569623 A | 4/2015 | |
| CN | 104640073 A | 5/2015 | |

OTHER PUBLICATIONS

Ubuntu Publishing History of iw package. (Year: 2018).*
PDF copy of an Ask Ubuntu page to verify a question related to IW in 2011. (Year: 2018).*
Office Action from corresponding Chinese Application No. 201510882188.1 dated Mar. 23, 2018 (6 pages).

\* cited by examiner

METHOD AND APPARATUS FOR DETERMINING THE RADIATION STRENGTH OF A WI-FI SIGNAL

CROSS-REFERENCE TO RELATED APPLICATION

This application claims the benefit and priority of Chinese Patent Application No. 201510882188.1 filed Dec. 3, 2015. The entire disclosure of the above application is incorporated herein by reference.

FIELD

The present disclosure relates to the field of network communications, and particularly to a method and apparatus for determining the radiation strength of a Wi-Fi signal.

BACKGROUND

This section provides background information related to the present disclosure which is not necessarily prior art.

As the level of our living is growing, Wireless-Fidelity (Wi-Fi) has been widely applied to respective aspects of our life, e.g., at home, in an office, in a shopping mall, on a bus, etc., so that Wi-Fi signals are widespread in the respective aspects of our life. It is the most desirable for people arriving at some place to ask for Wi-Fi available around them. In the meanwhile, radiation of the Wi-Fi signals has also become an important aspect within which people are concerned. Although Wi-Fi brings a lot of convenience to people, the widespread Wi-Fi signals have also become a killer to our health. Particularly as routers become more and more functionally powerful, and both their transmission rates and transmit power have been significantly improved, the radiation of these signals has become more pronounced as a result.

SUMMARY

This section provides a general summary of the disclosure, and is not a comprehensive disclosure of its full scope or all of its features.

Some embodiments of the disclosure provide a terminal including:

a memory; and
one or more processors, wherein:
the memory stores therein one or more computer readable program codes, and the one or more processors are configured to execute the one or more computer readable program codes:
to determine at least one signal source corresponding to a WiFi signal at the current position, and at least one signal strength value corresponding to the at least one signal source at the current position, when a WiFi function is enabled;
to determine a signal strength adjustment value according to the at least one signal strength value;
to determine that the signal strength adjustment value exceeds a preset threshold; and
to generate and issue warning information.

Some embodiments of the disclosure provide a method for determining the radiation strength of a Wi-Fi signal, the method including:

obtaining Wi-Fi signal sources, and signal strength values of the signal sources when a Wi-Fi function is enabled; and
determining the radiation strengths of corresponding Wi-Fi signals according to the number of Wi-Fi signal sources, and the signal strength values of the respective signal sources.

Some embodiments of the disclosure provide an apparatus for determining the radiation strength of a Wi-Fi signal, the apparatus including:

a memory; and
one or more processors, wherein:
the memory stores therein one or more computer readable program codes, and the one or more processors are configured to execute the one or more computer readable program codes to perform:
obtaining Wi-Fi signal sources, and signal strength values of the signal sources when a Wi-Fi function is enabled; and
determining the radiation strengths of corresponding Wi-Fi signals according to the number of Wi-Fi signal sources, and the signal strength values of the respective signal sources.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
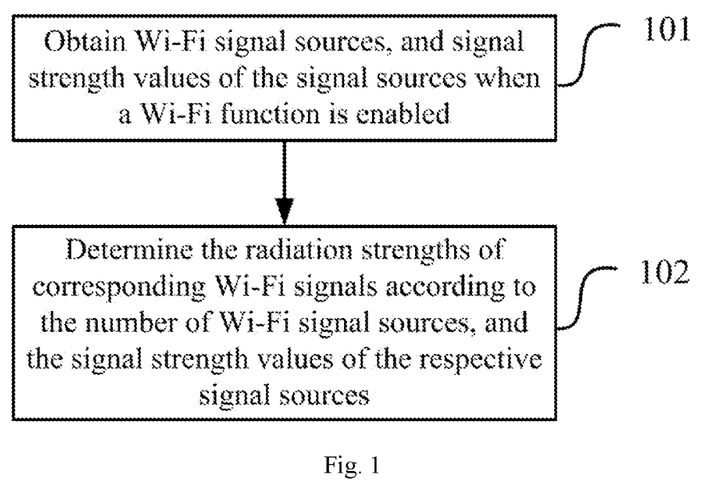
FIG. 1 is a flow chart of a method for determining the radiation strength of a Wi-Fi signal according to some embodiments of the disclosure.

FIG. 1 is a schematic flow chart of a method for determining the radiation strength of a Wi-Fi signal according to some embodiments of the disclosure, and as illustrated, the method can include the following operations:

The operation 101 is to obtain Wi-Fi signal sources, and signal strength values of the signal sources when a Wi-Fi function is enabled; and The operation 102 is to determine the radiation strengths of corresponding Wi-Fi signals according to the number of Wi-Fi signal sources, and the signal strength values of the respective signal sources.

For the sake of better understanding, embodiments of the disclosure embodied in an Android terminal will be described below, but the disclosure can be embodied in any devices which can obtain Wi-Fi signal sources, and signal strength values of the signal sources when the Wi-Fi function is enabled. The Android terminal will be described merely for the purpose of teaching those skilled in the art particularly how to put the disclosure into practice, but this shall not suggest that the disclosure can only be applicable to the Android terminal; and a particular device to which the disclosure is applicable can be determined as needed in practice in an implementation thereof.

In some implementations, the Wi-Fi signal sources, and the signal strength values of the signal sources are obtained by a driver debugging tool.

The driver debugging tool can be configured to scan surrounding Wi-Fi signals for their Service Set Identifiers (SSIDs) and strength values. The driver debugging tool can invoke a Wi-Fi driver to scan Wi-Fi signals for their SSIDs and strength values.

In some implementations, the driver debugging tool is an IW tool.

In some embodiments, the IW tool is described as an example because the IW tool is a driver debugging tool publicly available from Android, and applicable to all the Android systems, and the IW tool is readily and commonly available; and as can be apparent, the driver debugging tool can be embodied as any facility which can scan Wi-Fi signals for their Service Set Identifiers (SSIDs) and strength values, and the driver debugging tool is embodied as the IW tool merely for the purpose of teaching those skilled in the art particularly how to put the disclosure into practice, but this shall not suggest that the driver debugging tool can only be embodied as the IW tool; and a particular tool embodying the driver debugging tool can be determined as needed in practice in an implementation thereof.

In some implementations, the Wi-Fi signal sources, and the signal strength values of the Wi-Fi signal sources are obtained by invoking the IW tool to make an IW wlan0 scan, where wlan0 is a station device generated by Wi-Fi.

In some embodiments, after the Wi-Fi function is enabled, the Wi-Fi will generate a station device: wlan0. After the Wi-Fi function is enabled, an IW service is started, and an IW wlan0 scan operation is performed, where the scan operation of the Wi-Fi driver is invoked automatically, and a series of information parameters of scanned hotspots are returned, including channel frequencies (freq), signal strengths (Received Signal Strength Indicators (RSSIs)), SSIDs, and other information of the hotspots.

In some embodiments, if the radiation strengths of the Wi-Fi signal are above a preset threshold, then an alert will be issued, and/or the number of Wi-Fi signal sources, and the signal strength values of the signal sources will be announced.

In some embodiments, all the scanned signal strengths and SSIDs are stored in such a way that each SSID corresponds to one of the signal strengths, and then a surrounding Wi-Fi radiation condition is determined using the values of the information.

Wi-Fi signals with different radiation strengths are categorized into four classes dependent upon the signal strengths, and the number of surrounding Wi-Fi signals: an excessively radiating Wi-Fi signal, a strongly radiating Wi-Fi signal, a normally radiating Wi-Fi signal, and a weakly radiating Wi-Fi signal. It is also assumed that a signal with a signal strength more than −20 dBm or −30 dBm is defined as a hazardous signal source, and a signal with a signal strength more than −60 dBm and less than −30 dBm is defined as a normal hazardous signal source. The following four instances can be defined:

(1) If the number of signals with signal strengths more than −20 dBm or −30 dBm is more than 3, then it will be determined that there is an excessively radiating Wi-Fi signal surrounding, that is, if there are more than 3 hazardous signal sources, then they will be referred to as an excessively radiating Wi-Fi signal.

(2) If the number of signals with signal strengths more than −60 dBm is more than 5, then it will be determined that there is a strongly radiating Wi-Fi signal surrounding, that is, if there are more than 5 normally hazardous signal sources, then they will be referred to as a strongly radiating Wi-Fi signal.

(3) If the number of signals with signal strengths more than −60 dBm ranges from 1 to 5, then it will be determined that there is a normally radiating Wi-Fi signal surrounding, that is, if there are more than 1 to 5 normally hazardous signal sources, then they will be referred to as a normally radiating Wi-Fi signal.

(4) If none of the instances is satisfied, then it will be determined that there is a weakly radiating Wi-Fi signal surrounding so that a human body will not be affected, that is, if there is neither a hazardous signal source nor a normally hazardous signal source, then they will be referred to as a weakly radiating Wi-Fi signal.

If the Wi-Fi signals are determined as an excessively radiating Wi-Fi signal, then an alert "Warning: there are hazardous signal sources surrounding" and the SSIDs of the hazardous signal sources will be presented on an interface.

If the Wi-Fi signals are determined as a strongly radiating Wi-Fi signal, then an alert "Warning: there are too many normally hazardous signal sources surrounding" and the SSIDs of the normally hazardous signal sources will be presented on an interface.

If the Wi-Fi signals are determined as a normally radiating Wi-Fi signal, then an alert "Attention: there are normally hazardous signal sources surrounding" and the SSIDs of the normally hazardous signal sources will be presented on an interface.

If the Wi-Fi signals are determined as a weakly radiating Wi-Fi signal, then an alert "There is no hazardous signal source surrounding" will be presented on an interface.

Of course, the categorization above of the Wi-Fi signals with different radiation strengths into 4 classes is merely one of possible categorization schemes, and a particular embodiment of the disclosure will not be limited thereto, but any possible categorization of the Wi-Fi signals dependent upon the signal strength values, and the number of surrounding Wi-Fi signals will be applicable. Moreover an embodiment of the disclosure will not be limited to the particular strength values of the Wi-Fi signals, and the particular numbers of surrounding Wi-Fi signals for categorizing the strongly and weakly radiating Wi-Fi signals as long as any scheme capable of reflecting strong and weak radiation of the Wi-Fi signals can be applicable. For example, alternatively 2 hazardous signal sources and 3 normally hazardous signal sources can be defined as an excessively radiating Wi-Fi signal.

If there are signal sources with signal strengths more than −60 dBm, and signal sources with signal strengths more than −30 dBm, then either or both of them can be displayed as needed, for example, only the hazardous signal sources are displayed, or both the hazardous signal sources and the normally hazardous signal sources are displayed.

In the embodiments above, the radiation strengths of the Wi-Fi signals can be obtained, that is, it can be determined whether the surrounding Wi-Fi signals exceed a standard health range, and a user can be provided with a corresponding suggestion according to a determination result.

Figure 2:
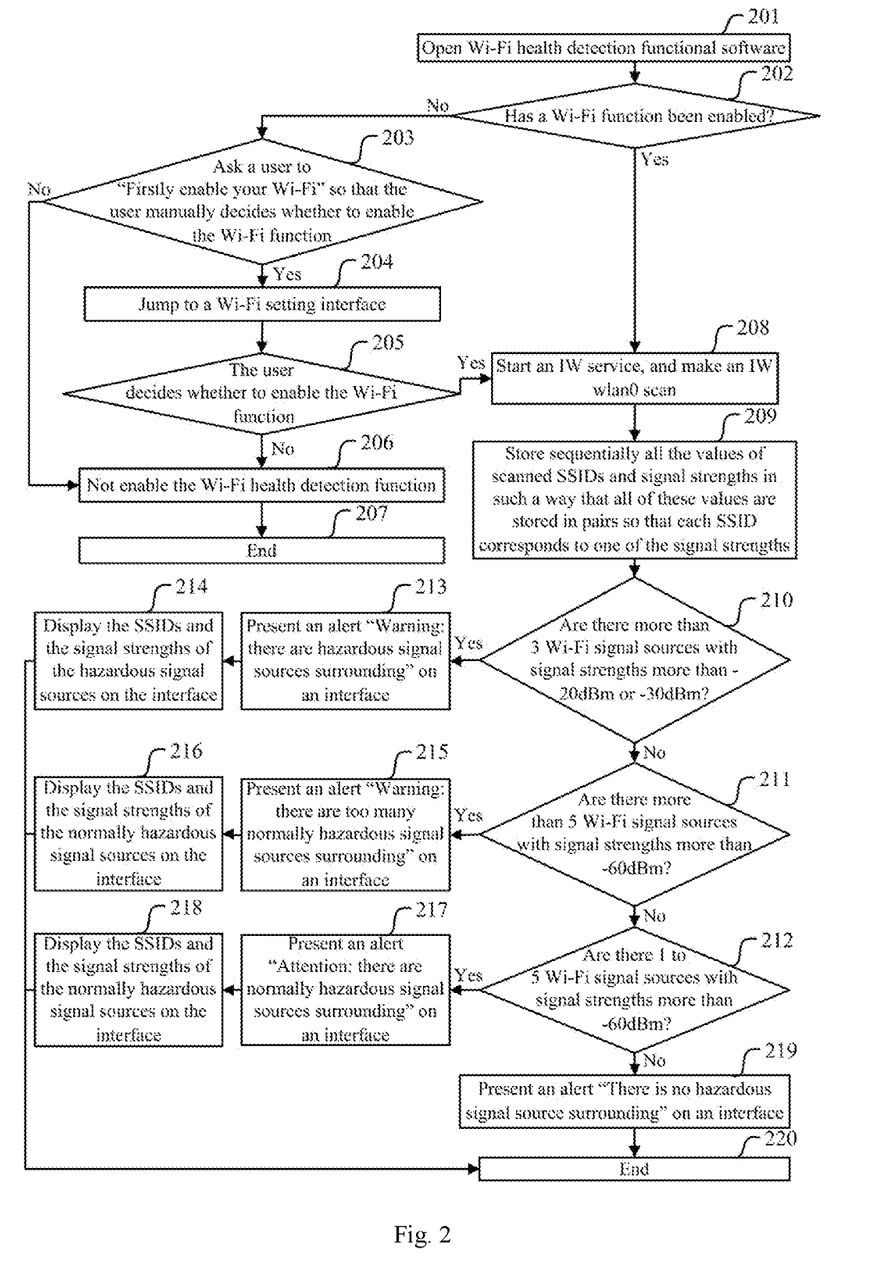
FIG. 2 is a schematic flow chart of detecting Wi-Fi health according to some embodiments of the disclosure.

FIG. 2 is a schematic flow chart of detecting Wi-Fi health, and as illustrated, the flow can include the following operations:

The operation 201 is to Open Wi-Fi health detection functional software.

The operation 202 is to determine whether a Wi-Fi function has been enabled, and if so, then the flow will jump to the operation 208; otherwise, the flow will proceed to the operation 203.

The operation 203 is to ask a user to "Firstly enable your Wi-Fi" so that the user manually decides whether to enable the Wi-Fi function, and if so, then the flow will proceed to the operation 204; otherwise, the flow will jump to the operation 206.

The operation 204 is to jump to a Wi-Fi setting interface.

The operation 205 is for the user to decide whether to enable the Wi-Fi function, and if so, then the flow will jump to the operation 208; otherwise, the flow will proceed to the operation 206.

The operation 206 is not to enable the Wi-Fi health detection function, and the flow proceeds to the operation 207.

In the operation 207, the flow ends, and the program will not further proceed.

The operation 208 is to start an IW service, and to make an IW wlan0 scan.

The operation 209 is to store sequentially all the values of scanned SSIDs and signal strengths in such a way that all of these values are stored in pairs so that each SSID corresponds to one of the signal strengths.

The operation 210 is to determine whether there are more than 3 Wi-Fi signal sources with signal strengths more than −20 dBm or −30 dBmm, and if so, then the flow will jump to the operation 213; otherwise, the flow will proceed to the operation 211.

The operation 211 is to determine whether there are more than 5 Wi-Fi signal sources with signal strengths more than −60 dBm, and if so, then the flow will jump to the operation 215; otherwise, the flow will proceed to the operation 212.

The operation 212 is to determine whether there are 1 to 5 Wi-Fi signal sources with signal strengths more than −60 dBm, and if so, then the flow will jump to the operation 217; otherwise, the flow will proceed to the operation 219.

The operation 213 is to present an alert "Warning: there are hazardous signal sources surrounding" on an interface, and the flow will proceed to the operation 214.

The operation 214 is to display the SSIDs and the signal strengths of the hazardous signal sources on the interface, and the flow jumps to the operation 220.

The operation 215 is to present an alert "Warning: there are too many normally hazardous signal sources surrounding" on an interface, and the flow proceeds to the operation 216.

The operation 216 is to display the SSIDs and the signal strengths of the normally hazardous signal sources on the interface, and the flow jumps to the operation 220.

The operation 217 is to present an alert "Attention: there are normally hazardous signal sources surrounding" on an interface, and the flow proceeds to the operation 218.

The operation 218 is to display the SSIDs and the signal strengths of the normally hazardous signal sources on the interface, and the flow jumps to the operation 220.

The operation 219 is to present an alert "There is no hazardous signal source surrounding" on an interface, and the flow proceeds to the operation 220.

In the operation 220, the flow ends.

The embodiment above will be further described below:

After the Wi-Fi function is enabled, the IW tool is started, and the IW wlan0 scan is made, so that an outline of all the scanned surrounding Wi-Fi hotspots is returned, for example:

BSS 54:e6:fc:33:b2:06 (on wlan0)—associated
TSF: 87382551097 usec (1d, 00:16:22)
Freq: 2447
beacon interval: 100
capability: ESS ShortPreamble (0x0021)
signal: −68.00 dBm
last seen: 0 ms ago
Information elements from Probe Response frame:
SSID (Service Set Identifier): 11 n
Supported rates: 1.0*2.0*5.5*11.0*
DS Parameter set: channel 8
WMM (Wireless multimedia):
   Parameter version1
   u-APSD
   BE (Best effort): CW 31-1023, AIFSN 3
   BK (Background): CW 31-1023, AIFSN 7
   VI (video): CW 15-31, AIFSN 2, TXOP 6016 usec
   VO (voice): acm CW 7-15, AIFSN 2, TXOP 3264 usec
WPS (Wi-Fi Protected Setup):
   Version: 1.0
   Wi-Fi Protected Setup State: 2 (Configured)
   Response Type: 3 (AP)
   UUID (Universally Unique Identifier):
   00000000-0000-1000-0000-54e6fc33b206
   Manufacturer: TP-LINK
   Model: TL-WR941N
   Model Number: 4.0/5.0
   Serial Number: 1.0
   Primary Device Type: 6-0050f204-1
   Device name: Wireless Router TL-WR941N
   Config methods: Ethernet, Label, PBC (Push Button Control)
   RF Bands (Radio Frequency Bands): 0x1

As can be apparent from the results returned above, the signal strength value (−68.00 dBm) of the scanned Wi-Fi hotspot, and the name (11 n) of the hotspot can be obtained. The signal strength value of each scanned Wi-Fi hotspot, and the name of the hotspot can be obtained sequentially.

Based upon the same inventive idea, some embodiments of the disclosure further provide an apparatus for determining the radiation strength of a Wi-Fi signal, and since the apparatus addresses the problem under a similar principle to the method for determining the radiation strength of a Wi-Fi signal, reference can be made to the implementation of the method for an implementation of the apparatus, and a repeated description thereof will be omitted here.

Figure 3:
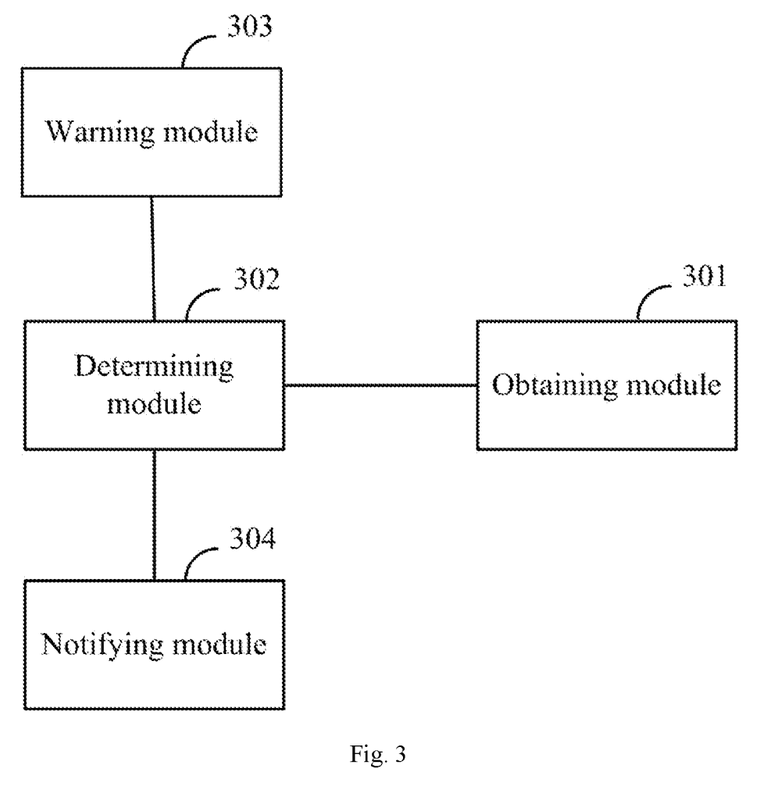
FIG. 3 is a schematic structural diagram of an apparatus for determining the radiation strength of a Wi-Fi signal according to some embodiments of the disclosure.

FIG. 3 is a schematic structural diagram of an apparatus for determining the radiation strength of a Wi-Fi signal, and as illustrated, the apparatus can include:

An obtaining module 301 is configured to obtain Wi-Fi signal sources, and signal strength values of the signal sources when a Wi-Fi function is enabled; and A determining module 302 is configured to determine the radiation strengths of corresponding Wi-Fi signals according to the number of Wi-Fi signal sources, and the signal strength values of the respective signal sources.

In some implementations, the obtaining module can be further configured to obtain the Wi-Fi signal sources, and the signal strength values of the signal sources using a driver debugging tool.

In some implementations, the obtaining module can be further configured to use the driver debugging tool which is an IW tool.

In some implementations, the obtaining module can be further configured to obtain the Wi-Fi signal sources, and the signal strength values of the signal sources by invoking the IW tool to make an IW wlan0 scan, where wlan0 is a station device generated by Wi-Fi.

In some implementations, the apparatus can further include: a warning module 303 configured to warn if the radiation strengths of the Wi-Fi signals are above a preset threshold; and a notifying module 304 configured to notify the number of Wi-Fi signal sources and/or the signal strength values of the signal sources. The warning module and the notifying module are included in this embodiment, but only the warning module or only the notifying module may be included in another embodiment of the disclosure.

Figure 4:
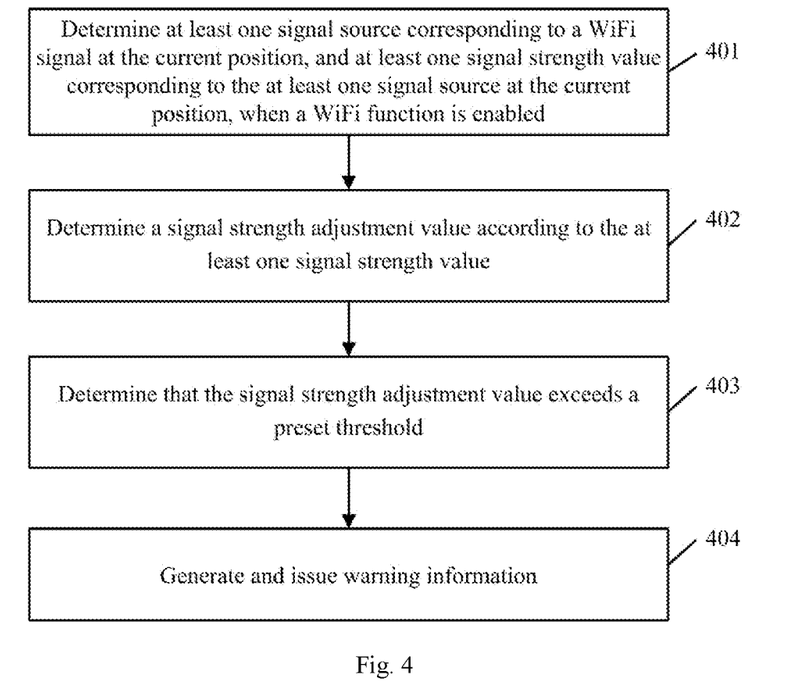
FIG. 4 is a schematic flow chart of a method for determining the radiation strength of a Wi-Fi signal according to some embodiments of the disclosure.

Some embodiments of the disclosure further provides a method for determining the radiation strength of a Wi-Fi signal as illustrated in FIG. 4, where the method can include the following operations:

The operation 401 is to determine at least one signal source corresponding to a WiFi signal at the current position, and at least one signal strength value corresponding to the at least one signal source at the current position, when a WiFi function is enabled.

The operation 402 is to determine a signal strength adjustment value according to the at least one signal strength value.

The operation 403 is to determine that the signal strength adjustment value exceeds a preset threshold.

The operation 404 is to generate and issue warning information.

If the WiFi function is enabled, then a terminal will determine the at least one signal source corresponding to the WiFi signal at the current position, where the signal strength adjustment value is one of the at least one signal strength value, and the preset threshold is a first preset threshold.

In the operation 402 above, the signal strength adjustment value can be determined according to the at least one signal strength value particularly in the following operations:

The operation a is to determine that all the at least one signal strength value is below a second preset threshold.

The operation b is to obtain the sum of N signal strength values among the at least one signal strength value, where N is an integer more than 1.

The operation c is to determine the sum as the signal strength adjustment value.

Here if it is determined in the operation a that there are 5 signal strength values, all of which are below the second preset threshold, then N signal strength values will be selected among the 5 signal strength values, and the sum of the N signal strength values will be determined as the signal strength adjustment value, where $1<N\leq5$.

The first preset threshold and the second preset threshold in some embodiments of the disclosure can be preset empirically and as needed in practice.

The warning information generated and issued by the terminal can be audio information, image information, and/or text information, which can include the names, e.g., SSIDs, of the signal sources corresponding to the signal strength adjustment value, and/or the signal strength values corresponding to the signal strength adjustment value. If there are a number of signal strength values, all of which are below the second preset threshold, and the sum of N signal strength values among them is determined as the signal strength adjustment value, then the warning information can further include the names of N signal sources corresponding to the N signal strength values, and/or the N signal strength values.

Figure 5:
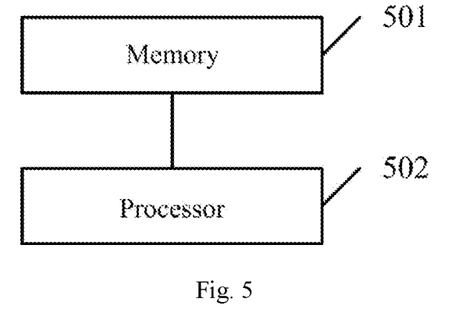
FIG. 5 is a schematic structural diagram of a terminal according to some embodiments of the disclosure.

Some embodiments of the disclosure further provide a terminal as illustrated in FIG. 5 including:
A memory 501; and
One or more processors 502, where:
The memory stores therein one or more computer readable program codes, and the one or more processors are configured to execute the one or more computer readable program codes:

To determine at least one signal source corresponding to a WiFi signal at the current position, and at least one signal strength value corresponding to the at least one signal source at the current position, when a WiFi function is enabled;

To determine a signal strength adjustment value according to the at least one signal strength value;

To determine that the signal strength adjustment value exceeds a preset threshold; and To generate and issue warning information.

Where the signal strength adjustment value is one of the at least one signal strength value, and the preset threshold is a first preset threshold.

The one or more processors configured to determine the signal strength adjustment value according to the at least one signal strength value are configured:

To determine that all the at least one signal strength value is below a second preset threshold;

To obtain the sum of N signal strength values among the at least one signal strength value, where N is an integer more than 1; and To determine the sum as the signal strength adjustment value.

The warning information includes audio information, image information, and/or text information.

The terminal includes a display screen, and the one or more processors configured to issue the warning information are configured:

To display the warning information on the display screen.

The warning information includes the names of signal sources corresponding to the signal strength adjustment value, and/or the signal strength values corresponding to the signal strength adjustment value.

The warning information includes the names of N signal sources corresponding to the N signal strength values, and/or the N signal strength values.

As can be apparent from the embodiments above, with the technical solutions according to some embodiments of the disclosure, if it is determined that the Wi-Fi function is enabled, then the Wi-Fi signal sources and the signal strength values will be obtained, so that the radiation strengths of the Wi-Fi signals can be determined according to the number of Wi-Fi signal sources, and the signal strength values of the respective signal sources to thereby provide a reference for grading the radiation strengths, and a basic for notifying the user of the surrounding Wi-Fi radiation strength.

If the radiation strengths of the Wi-Fi signals are above the preset threshold, then the names and the signal strength values of the respective Wi-Fi signal sources can be further displayed or alerted to the user so that the user can take a corresponding countermeasure.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A terminal comprising:
   a memory; and
   one or more processors, wherein the memory stores therein one or more computer readable program codes, and the one or more processors are configured to execute the one or more computer readable program codes to:
   invoke an IW tool to make an IW wlan0 scan when a Wi-Fi function is enabled, wherein wlan0 is a station device generated by Wi-Fi;
   determine a plurality of signal sources corresponding to a plurality of current Wi-Fi signals at one or more current positions, and a plurality of current signal strength values corresponding to the plurality of signal sources, according to a scan result of the IW wlan0 scan;
   categorize the plurality of current Wi-Fi signals corresponding to the plurality of signal sources, according to the number of the plurality of signal sources and the plurality of current signal strength values corresponding to the plurality of signal sources, into a first radiation strength class if a first threshold number of the plurality of signal sources each have a signal strength value greater than a first threshold value, a second radiation strength class if a second threshold number of the plurality of signal sources each have a signal strength value greater than a second threshold value, a third radiation strength class if a third threshold number of the plurality of signal sources each have a signal strength value less than or equal to the second threshold value, and a fourth radiation strength class if the Wi-Fi signals are not categorized into the first radiation strength class, the second radiation strength class or the third radiation strength class;
   determine a signal strength adjustment value according to at least one signal strength value of the plurality of current signal strength values;
   determine that the signal strength adjustment value exceeds a preset threshold; and
   generate and issue warning information.

2. The terminal according to claim 1, wherein the signal strength adjustment value is one of the at least one signal strength value.

3. The terminal according to claim 2, wherein the warning information comprises the names of signal sources corresponding to the signal strength adjustment value, and/or the signal strength values corresponding to the signal strength adjustment value.

4. The terminal according to claim 1, wherein the preset threshold is a first preset threshold and wherein the one or more processors are further configured to execute the one or more computer readable program codes to:
   determine that each of the plurality of current signal strength values is below a second preset threshold;
   obtain a sum of N signal strength values of the plurality of current signal strength values, wherein N is an integer equal to or greater than 1; and
   determine the sum as the signal strength adjustment value.

5. The terminal according to claim 4, wherein the warning information comprises the names of N signal sources corresponding to the N signal strength values, and/or the N signal strength values.

6. The terminal according to claim 1, wherein the warning information comprises audio information, image information, and/or text information.

7. The terminal according to claim 1, wherein the terminal comprises a display screen, and the one or more processors are further configured to execute the one or more computer readable program codes to display the warning information on the display screen.

8. The terminal according to claim 1, wherein the first threshold number is three or more and/or the first threshold value is −20 dBm or −30 dBm.

9. The terminal according to claim 1, wherein the second threshold number is five or more and/or the second threshold value is −60 dBm.

10. The terminal according to claim 1, wherein the third threshold number is one, two, three, four or five and/or the second threshold value is −60 dBm.

11. A method for determining a current radiation strength of Wi-Fi signals, the method comprising:
    invoking an IW tool to make an IW wlan0 scan when a Wi-Fi function is enabled, wherein wlan0 is a station device generated by Wi-Fi;
    obtaining Wi-Fi signal sources and current signal strength values of the Wi-Fi signal sources according to a scan result of the IW wlan0 scan; and
    categorizing current Wi-Fi signals corresponding to the Wi-Fi signal sources, according to the number of the Wi-Fi signal sources and the current signal strength values corresponding to the Wi-Fi signal sources, into a first radiation strength class if a first threshold number of the Wi-Fi signal sources each have a signal strength value greater than a first threshold value, a second radiation strength class if a second threshold number of the Wi-Fi signal sources each have a signal strength value greater than a second threshold value, a third radiation strength class if a third threshold number of the Wi-Fi signal sources each have a signal strength value less than or equal to the second threshold value, and a fourth radiation strength class if the Wi-Fi signals are not categorized into the first radiation strength class, the second radiation strength class or the third radiation strength class.

12. The method according to claim 11, further comprising generating an alert corresponding to the first radiation strength class, the second radiation strength class, the third radiation strength class or the fourth radiation strength class.

13. The method according to claim 11, wherein the first threshold number is three or more and/or the first threshold value is −20 dBm or −30 dBm.

14. The method according to claim 11, wherein the second threshold number is five or more and/or the second threshold value is −60 dBm.

15. The method according to claim 11, wherein the third threshold number is one, two, three, four or five and/or the second threshold value is −60 dBm.

16. An apparatus for determining a current radiation strength of Wi-Fi signals, the apparatus comprising:
- a memory; and
- one or more processors, wherein the memory stores therein one or more computer readable program codes, and the one or more processors are configured to execute the one or more computer readable program codes to:
    - invoke an IW tool to make an IW wlan0 scan when a Wi-Fi function is enabled, wherein wlan0 is a station device generated by Wi-Fi;
    - obtain Wi-Fi signal sources and current signal strength values of the Wi-Fi signal sources according to a scan result of the IW wlan0 scan; and
    - categorize current Wi-Fi signals corresponding to the Wi-Fi signal sources, according to the number of the Wi-Fi signal sources and the current signal strength values corresponding to the Wi-Fi signal sources, into a first radiation strength class if a first threshold number of the Wi-Fi signal sources each have a signal strength value greater than a first threshold value, a second radiation strength class if a second threshold number of the Wi-Fi signal sources each have a signal strength value greater than a second threshold value, a third radiation strength class if a third threshold number of the Wi-Fi signal sources each have a signal strength value less than or equal to the second threshold value, and a fourth radiation strength class if the Wi-Fi signals are not categorized into the first radiation strength class, the second radiation strength class or the third radiation strength class.

17. The apparatus according to claim 16, wherein the one or more processors are further configured to execute the codes to generate an alert corresponding to the first radiation strength class, the second radiation strength class, the third radiation strength class or the fourth radiation strength class.

18. The apparatus according to claim 16, wherein the first threshold number is three or more and/or the first threshold value is −20 dBm or −30 dBm.

19. The apparatus according to claim 16, wherein the second threshold number is five or more and/or the second threshold value is −60 dBm.

20. The apparatus according to claim 16, wherein the third threshold number is one, two, three, four or five and/or the second threshold value is −60 dBm.

* * * * *